2 Sheets--Sheet 1.

W. D. HUGHES.
Method of Imposing and Printing from Newspaper Forms.

No. 165,833. Patented July 20, 1875.

THE EVENING RECORD.

VOL. X.   PHILADELPHIA, JANUARY, 1875.   No. 129.

Value of Reading.

No matter how obscure the position in life of an individual, if he can read he may at will put himself in the best of society the world has ever seen. He may converse with all the writers in prose and poetry. He may learn how to live, how to avoid all errors of life.

———o———

COURSING is one of the amusements of the season in California.

THE Orleans family in France are said to be selling off their real estate.

Progress.

Printers made use of but one side of the leaf when first the art of printing was discovered; they had not found out the expedient of impressing the other. This idea came to them only by degrees, and after they had tried the experiment of pasting the blank sides together to make two leaves appear like one.

———o———

SEVERAL fatal cases are reported from Scotland of persons overwhelmed in the snow.

Items.

Last year Buff lo made 161,248 barrels of beer and 17,4:8 barrels of ale, a falling off of 27,000 barrels from the previous year.

California is noted for the excellence of her honey, and will export 400,000 pounds of honey.

The silver and gold ore veins from Newburyport mines have been traced 15 miles into New Hampshire.

George Brown, the champion oarsman, is reported to be dangerously ill at Halifax.

NOVELTIES
FOR 1875.

FENTON & CO.,

917 CHESTNUT ST.,

Are receiving daily new and elegant designs of

FRENCH,
ENGLISH,
and
AMERICAN

PERCALES
AND
CAMBRICS, for Shirting and of Dress Styles, with special view to the
SPRING TRADE.

The attention of the trade is especially invited to an inspection of these goods.

monsly of the opinion that libel suits them.

A politician spoke of his conscience as an "inward monitor." "Yes," said the auditor, "it's a reg'lar iron-clad."

An old gander was recently killed in Virginia at the age of ninety. The name of the fortunate boarding-house that drew the prize is not given.

Why is a frog like a loaf of bread? Because it's raised by hops.

A bright boy told his teacher there were three sexes—the male sex, the female sex, and insects.

Foot-pads—bunion plasters.

Jocular Items.

A head wind—a sneeze.

Barnum is married. We P. T. Barnum.

The Quaker loves the ocean because of its broad brim.

Why should a spider be a good correspondent? Because he drops a line by every post.

Two heads are better than one—especially in a barrel.

The bump of destructiveness—a railroad collision.

There are many who can't read who know a bee sees.

If those Brooklyn people all get the damages they claim in their libel suits, they will be unani-

N. PETERS, PHOTO-LITHOGRAPHER, WASHINGTON, D. C.

W. D. HUGHES.

Method of Imposing and Printing from Newspaper Forms.

No. 165,833. Patented July 20, 1875.

2 Sheets--Sheet 2.

THE RECORD.

PHILADELPHIA:
TUESDAY, JAN., 1875.

---

1875.

The year 1875 has been entered upon. Let those who have been spared to see it be thankful; and let them resolve to improve their habits, to abandon whatever of error there may have been in their ways, to pardon trespasses, to be reconciled to all with whom they may have been at variance to the end that all may live peacefully and in harmony with each other.

The year just closed has not been without its marked events.

The panic has taught a lesson of great value It has demonstrated that the extravagant and destructive habits so much indulged in, especially during the past decade, must be abandoned, and that industry, frugality, and moderation are the real, the true paths to success, happiness, and prosperity.

---o---

BETTER.—A beautiful form is better than a beautiful face. A beautiful behavior is better than a beautiful form: it is more to be admired than the beauties of nature or of painting. It is the finest of the fine arts.

HEAVY RIBBED ALL-WOOL UNDERWEAR.

MERINO UNDERWEAR.

For Ladies, Gentlemen, and Children.

HOSIERY
AND
FANCY
WOOLENS,

SCARFS,
JACKETS,
GAITERS,

Good quality goods at lowest prices, at

HOMAN'S,
923 Sixth street.

THOMAS SMITH,
ARTIST,
923 Sixteenth street.
Homan Hall.

THE LATEST!

By Telegraph.

---

Valuable Invention.

Washington, Jan. 15.—A new method for printing newspapers has been invented by which is doubled the capacity of any printing press to furnish papers containing latest news.

---o---

A LAZY dyspeptic, inquired of a friend, "What do you do to make yourself so strong and healthy?" "Live on fruit alone, sir," answered the friend. "What kind of fruit?" "The fruit of industry, and I am never troubled with indigestion."

BARGAINS
IN
DRY GOODS,

SHAWLS,
SILKS,
ALPACAS,
MOHAIRS,
CASHMERES,
MERINOS,
DELAINES,
PONGEES,
STRIPES,
POPLINS,
SKIRTINGS,
CHINTZES,
CLOAKINGS,

All at prices ten per cent. less than ruled last week.

GARNER & CO.,
923 Sixth street,
Wholesale and Retail Dealers in

FINE FAMILY
GROCERIES,
FLOUR, AND
PRODUCE.

Goods delivered in all parts of the city.

---

NEW GOODS.

JOHN LEVY,
923 Chestnut street,
Has just received a large lot of
CHOICE GOODS,
which are offered at reduced prices.

---

ROTARY PRINTING PRESS

Will be sold at a bargain if applied for to-day. 923 Third st.

UNITED STATES PATENT OFFICE.

WILLIAM D. HUGHES, OF PHILADELPHIA, PENNSYLVANIA.

IMPROVEMENT IN METHODS OF IMPOSING AND PRINTING FROM NEWSPAPER FORMS.

Specification forming part of Letters Patent No. 165,833, dated July 20, 1875; application filed September 18, 1874.

*To all whom it may concern:*

Be it known that I, WILLIAM D. HUGHES, of the city of Philadelphia, in the State of Pennsylvania, have invented a certain new and useful Method of Imposing and Printing from Newspaper Forms; and I do hereby declare that the following is a full, clear, and exact description thereof, which will enable others skilled in the art to which it pertains to make use of the same.

The object of my invention is to so improve the method of printing newspapers as to greatly increase the capacity of printing-presses to furnish papers containing the latest news. This object is accomplished by my method, hereinafter described, to the extent of at least doubling the capacity of any press during the only time which is of value in the use of the press for newspaper printing, namely, the time from the receipt of the latest news till the completion of the printing of the whole edition. This increased capacity may be utilized in either of four ways: First, at least double the number of papers can be supplied which any press or presses could by the only process known previous to my invention furnish in a given time from the moment of the insertion of the latest news in the form; second, closing the news at the same time as by the existing method the printing of the edition can be completed in half the time now consumed thereby, and consequently the edition be much sooner delivered to the readers; third, the latest news may be waited for and inserted for a period longer by fully half the time now occupied in printing the whole edition, and yet the whole edition be completed by the same hour it is by the existing method; fourth, by this fast-printing process a much larger margin of time is given for the procuring of information, the setting of type, and the correction of proofs.

My invention is applicable in all cases where all the pages of the paper are worked at once, and this has become the general rule, as it greatly facilitates the work.

The manner of printing newspapers heretofore most generally practiced has been to print all the pages of a newspaper at one impression on one side of a double sheet, and then, reversing the sheet, print the opposite side, and cut the sheet into two complete newspapers. In order that the latest news received might be inserted, all the forms have been necessarily withheld from the press until that object was accomplished. The presswork then commenced at the last moment to which the waiting for news could be extended, each impression made being equal to the printing of one complete newspaper to each cylinder. Usually the time occupied in printing an edition of a daily paper cannot be extended over a longer period than about two hours, in order that the papers may be furnished in seasonable time to the readers. The balance of the day the press stands idle and all the attendants unemployed. It had not, previous to my invention, been discovered that all the pages of a newspaper might be put to press in advance of their containing the latest news intended for publication in the issue, and half of the presswork be done before the final closing of the forms, and yet each copy of the paper thus put to press in advance be made to contain all the latest news received up to the usual hour of going to press or later, according to whichever of the four available ways already noted the publisher may choose to avail himself of the advantages of my invention.

The process invented by me is applied in this manner to the printing—for example—of a four-page newspaper, for the sake of illustration supposing it to be an evening paper, in the printing of which time is specially valuable, and which cannot possibly be delayed later than four o'clock in order to complete the edition in proper season for circulation. The four pages are closed with all the matter at hand at three o'clock and put to press. Working one side of the double sheet continuously, and avoiding all stoppages, that side of the whole edition will be printed within one hour. Meanwhile, while the printing has been going on, say, between three and four o'clock, whatever later news may have come to hand will have been put in type in duplicate. The forms are then opened, the duplicate matter almost instantaneously inserted in two opposite pages, the location of the new matter being, at option, one of the duplicates on the first or fourth page, and the other of the duplicates on the second or third page, in each case in the place of some miscellaneous or unimportant matter, the forms having been originally "made up" in anticipation of this transfer. The forms are then closed, the edition printed upon the second side, and the printing is completed in one hour instead of two, as formerly, two copies of the paper being furnished by each cylinder instead of one, as heretofore, thus doubling the capacity of the press, and each copy of the paper thus printed will contain the latest news, the only difference being that one-half of the edition will have the news upon the first or second page, and the other half upon the third or fourth page. By this method the actual printing is completed in half the usual time.

The accompanying two sheets of drawings illustrate the invention, Sheet 1 showing an impression from a four-page form, as made up for printing the first side of two papers; and Sheet 2 showing an impression from the same form arranged for printing the second side, with the duplicates inserted on the first and third pages.

If it be desirable to wait, say, an hour longer for news, the edition remaining the same in number as in the first instance, the first side will be sent to press at four o'clock, the news inserted at five, and the edition still be completed at six. Thus, while giving an additional hour for news-gathering, &c., a thing of the utmost importance, the work is yet finished as early as heretofore.

While expediting the work, as above set forth, my invention also gives a much greater margin to editors, reporters, telegraphic agents, and compositors, as the press-work may be actually going on while type is still being set and proofs read and corrected, thus obviating many errors heretofore occurring in journals by reason of their being indispensably put to press in haste, a difficulty for which there had not heretofore been conceived a remedy.

In the case of an eight-page newspaper, the size of the press being sufficiently large to admit all of the pages, the application of my invention is obviously as useful as in the case of a four-page journal. It will therefore be understood that the substance of my invention is to print all the pages of a newspaper at the same time, first printing the one side of two papers, of one paper the first and fourth pages, of the other the second and third pages, then printing the other side of the two papers—that is, backing the first paper with the second and third pages, and the second paper with the first and fourth pages—the backing in each paper containing all the latest news, consisting of matter which was not in the form at the time the first side was printed, thus enabling so much of the work to be done in advance of a period when the value of time is inestimable, previous to which period the press and the pressmen are usually idle.

It is obvious that my invention will in many establishments enable the expensive and delaying process of stereotyping to be dispensed with, for the reason that all that has been heretofore accomplished with two forms (duplicates) and two presses can by my process be done with one form and one press. Of course advertisements and other matter may also be inserted in the whole edition in the same manner as the latest news, or with it.

Another most valuable increase of speed is accomplished by my process, in that, as soon as the late news is upon the press, the delivery of the papers commences, whereas it is now the common practice to wait until a considerable number of papers are printed on one side before it is worth while to turn the paper for backing, in which way fully a half hour is frequently lost, to the great inconvenience of the publisher and the public. Printers, particularly experts in the craft, will readily see that this prevention of delay amounts to a considerable time which is most valuable, either for the purpose of waiting longer for late news or for the printing of a much larger edition in the given time. Besides, as both sides of the paper are by my method printed without stops, delays are prevented which heretofore were unavoidable—that is, stopping the press for the purpose of turning the paper for backing, as well as the balks in feeding, getting sheets upon the rollers—and similar annoying delays, which are the frequent and familiar consequences of such stoppages, and which stoppages, in the opinion of the most experienced pressmen, retard the progress of the press fully ten minutes in each case. Thus it will be seen that six such stops would be the loss of an hour, and at a period when time is of the greatest value.

In the use of my invention, two copies of the paper being perfected at the final printing containing the latest news by each cylinder, therefore, with a ten-cylinder rotary press, twenty copies are printed at each revolution of the press. Thus, from a press of twenty thousand present capacity, forty thousand papers per hour can as readily be supplied according to my method.

The matter necessary to be set in duplicate is in most cases inconsiderable, as it is the custom of the most enterprising publishers to wait for rather than set news for an hour or longer previous to putting their journals to press, generally but little in quantity being received at so late an hour; and while these duplicates frequenty may not exceed five hundred or a thousand ems, they become more valuable than duplicate forms, their utility being apparent in that one press accomplishes that which otherwise would require two. Besides, it is customary to pay by the hour the compositors who "wait," consequently the setting of the duplicates will generally cost nothing, as the time of such waits must be paid for, work or no work.

Having thus described my invention, what I claim as new, and desire to have secured to me by Letters Patent, is—

1. The method hereinbefore described of perfecting from one form at one impression two newspapers, each of which shall contain news or other matter not in the form when the first side of the two papers of each impression was printed, namely, by inserting before printing the second side of double sheets the later news or other matter in two opposite pages of the form from which the first side of the double sheets has been previously printed, the said form comprising all the pages of the newspaper.

2. The method of facilitating the issue of newspapers, which consists substantially as hereinbefore described, in putting all the pages of the paper to press and printing one side of double sheets in advance of the insertion of the latest news or other matter, then inserting such later matter in duplicate in the same form, and printing the second side of the double sheets, the latest news or other matter thus inserted appearing in both copies of the paper perfected at one impression.

In witness whereof my signature duly witnessed is appended this 18th day of September, 1874.

W. D. HUGHES.

Witnesses:
    JOHN M. YOUNG,
    C. W. KEESE.